US007827196B2

(12) United States Patent
Victor

(10) Patent No.: US 7,827,196 B2
(45) Date of Patent: Nov. 2, 2010

(54) EVALUATION OF ACCESS CONTROL AND FILTER CONDITIONS

(75) Inventor: David B. Victor, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/554,456

(22) Filed: Oct. 30, 2006

(65) Prior Publication Data

US 2008/0162068 A1   Jul. 3, 2008

(51) Int. Cl.
*G06F 7/00* (2006.01)
*G06F 17/30* (2006.01)
*G06F 15/16* (2006.01)

(52) U.S. Cl. ........................ 707/785; 717/124
(58) Field of Classification Search .............. 707/783, 707/785; 702/108; 717/124
See application file for complete search history.

(56) References Cited

U.S. PATENT DOCUMENTS

| 3,924,241 | A | 12/1975 | Kronies |
| 5,036,456 | A | 7/1991 | Koegel |
| 5,878,415 | A * | 3/1999 | Olds ............................. 707/9 |
| 6,253,195 | B1 | 6/2001 | Hudis et al. |
| 6,389,422 | B1 * | 5/2002 | Doi et al. ....................... 707/10 |
| 6,425,076 | B1 | 7/2002 | Killian |
| 6,918,124 | B1 | 7/2005 | Novik et al. |
| 7,409,512 | B1 * | 8/2008 | Kekre et al. .................. 711/161 |
| 2004/0059536 | A1 * | 3/2004 | Chang et al. ................. 702/120 |
| 2005/0021977 | A1 * | 1/2005 | Oberst ......................... 713/182 |
| 2005/0086562 | A1 * | 4/2005 | Demsky et al. ............. 714/100 |
| 2006/0155791 | A1 * | 7/2006 | Tene et al. ................... 707/206 |
| 2007/0005560 | A1 * | 1/2007 | Dodge ........................... 707/1 |

FOREIGN PATENT DOCUMENTS

| JP | 8335949 | 12/1996 |
| WO | WO 01/42887 | 6/2001 |

* cited by examiner

*Primary Examiner*—Greta L Robinson
*Assistant Examiner*—Brian E Weinrich
(74) *Attorney, Agent, or Firm*—Patterson & Sheridan, L.L.P.

(57) ABSTRACT

A method, computer program product, and system for evaluating access control or filter conditions are provided. The method, computer program product, and system provide for developing a test model involving a plurality of access control or filter conditions, assigning a binary value to each of a plurality of scenarios of the test model, wherein the binary value includes a binary digit for each of the plurality of access control or filter conditions, and calculating an expected result for each of the plurality of scenarios through a logical AND operation of the binary digits in the binary value assigned to the scenario.

20 Claims, 5 Drawing Sheets

FIG. 3

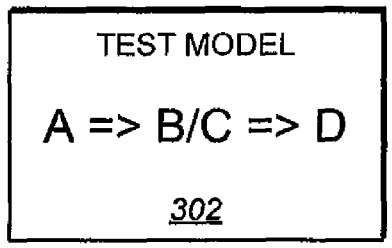

TEST MODEL

A => B/C => D

*302*

304

|  | C1 | C2 | C3 | C4 |
|---|---|---|---|---|
| Scenario 1 | 0 | 0 | 0 | 0 |
| Scenario 2 | 0 | 0 | 0 | 1 |
| Scenario 3 | 0 | 0 | 1 | 0 |
| Scenario 4 | 0 | 0 | 1 | 1 |
| Scenario 5 | 0 | 1 | 0 | 0 |
| Scenario 6 | 0 | 1 | 0 | 1 |
| Scenario 7 | 0 | 1 | 1 | 0 |
| Scenario 8 | 0 | 1 | 1 | 1 |
| Scenario 9 | 1 | 0 | 0 | 0 |
| Scenario 10 | 1 | 0 | 0 | 1 |
| Scenario 11 | 1 | 0 | 1 | 0 |
| Scenario 12 | 1 | 0 | 1 | 1 |
| Scenario 13 | 1 | 1 | 0 | 0 |
| Scenario 14 | 1 | 1 | 0 | 1 |
| Scenario 15 | 1 | 1 | 1 | 0 |
| Scenario 16 | 1 | 1 | 1 | 1 |

306

|  | C1 |  | C2 |  | C3 |  | C4 |  |  | Expected Result |
|---|---|---|---|---|---|---|---|---|---|---|
| Scenario 1 | 0 | & | 0 | & | 0 | & | 0 | = | 0 | (F) (Should Not Find Component D) |
| Scenario 2 | 0 | & | 0 | & | 0 | & | 1 | = | 0 | (F) (Should Not Find Component D) |
| Scenario 3 | 0 | & | 0 | & | 1 | & | 0 | = | 0 | (F) (Should Not Find Component D) |
| Scenario 4 | 0 | & | 0 | & | 1 | & | 1 | = | 0 | (F) (Should Not Find Component D) |
| Scenario 5 | 0 | & | 1 | & | 0 | & | 0 | = | 0 | (F) (Should Not Find Component D) |
| Scenario 6 | 0 | & | 1 | & | 0 | & | 1 | = | 0 | (F) (Should Not Find Component D) |
| Scenario 7 | 0 | & | 1 | & | 1 | & | 0 | = | 0 | (F) (Should Not Find Component D) |
| Scenario 8 | 0 | & | 1 | & | 1 | & | 1 | = | 0 | (F) (Should Not Find Component D) |
| Scenario 9 | 1 | & | 0 | & | 0 | & | 0 | = | 0 | (F) (Should Not Find Component D) |
| Scenario 10 | 1 | & | 0 | & | 0 | & | 1 | = | 0 | (F) (Should Not Find Component D) |
| Scenario 11 | 1 | & | 0 | & | 1 | & | 0 | = | 0 | (F) (Should Not Find Component D) |
| Scenario 12 | 1 | & | 0 | & | 1 | & | 1 | = | 0 | (F) (Should Not Find Component D) |
| Scenario 13 | 1 | & | 1 | & | 0 | & | 0 | = | 0 | (F) (Should Not Find Component D) |
| Scenario 14 | 1 | & | 1 | & | 0 | & | 1 | = | 0 | (F) (Should Not Find Component D) |
| Scenario 15 | 1 | & | 1 | & | 1 | & | 0 | = | 0 | (F) (Should Not Find Component D) |
| Scenario 16 | 1 | & | 1 | & | 1 | & | 1 | = | 1 | (T) (Should Find Component D) |

EVALUATION OF ACCESS CONTROL AND FILTER CONDITIONS

FIELD OF THE INVENTION

The present invention relates generally to database systems. More particularly, the present invention is directed to evaluation of access control and filter conditions in database systems.

BACKGROUND OF THE INVENTION

Access control and/or filter conditions are sometimes imposed on components stored in database systems. To evaluate whether an imposed access control or filter condition is correctly controlling access to components, a complete matching result set approach is typically used. The complete matching result set approach, however, unnecessarily relies on more complex results validation.

In addition, the complete matching result set approach involves unnecessary upfront test case development, is more prone to human error for ensuring all levels are correctly enforced, and requires more information to be absorbed by a test case developer in order to understand the full set of results of test cases for maintenance and debugging. Furthermore, complete matching result set verification may be intolerant of other models being tested on the same system when testing wild card situations because components that are unknown to the verification procedure may be returned as a part of the result set.

Consequently, there is a need to provide a mechanism to evaluate access control and filter conditions that is less prone to human error and makes sure all possible scenarios are verified.

SUMMARY OF THE INVENTION

A method, computer program product, and system for evaluating access control or filter conditions are provided. The method, computer program product, and system provide for developing a test model involving a plurality of access control or filter conditions, each of the plurality of access control or filter conditions being imposed upon one or more components stored in a database, assigning a binary value to each of a plurality of scenarios of the test model, wherein the binary value includes a binary digit for each of the plurality of access control or filter conditions, the binary digit representing passage or failure of the corresponding condition in the scenario, and calculating an expected result for each of the plurality of scenarios through a logical AND operation of the binary digits in the binary value assigned to the scenario.

BRIEF DESCRIPTION OF THE DRAWINGS

FIG. 3 shows an example test model according to an implementation of the invention.

DETAILED DESCRIPTION

Figure 1:
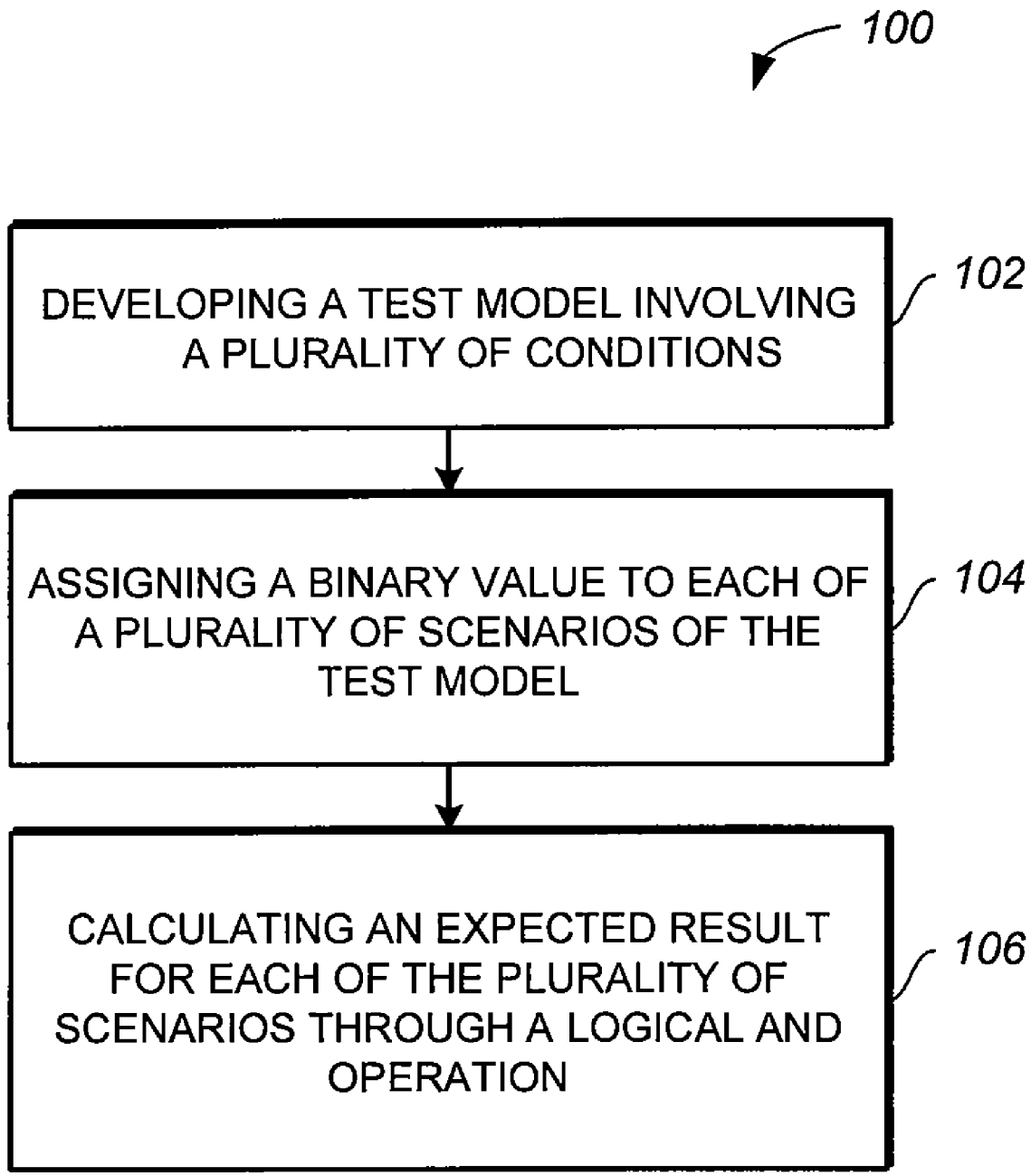
FIG. 1 depicts a flowchart of a method for evaluating access control or filter conditions according to an implementation of the invention.

The present invention relates generally to database systems and more particularly to evaluation of access control and filter conditions in database systems. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Database systems can store and manage large amounts of data. The term "component" is sometimes used to refer to a unit of data stored in a database. A component can be all or part of a document, image, video, audio, etc. Each component may be related to one or more other components. The relationships can be, for instance, hierarchical (e.g., parent-child) or lateral (e.g., sibling).

Access control and/or filter conditions are regularly imposed on components to limit access to the components. Access control conditions (e.g., access control settings) limit the entities (e.g., users, applications, clients, etc.) that have access to a component. Filter conditions (e.g., filter controls) limit the portions of a component or entire components that are accessible to particular entities based on values of the contents or states of the each component. Conditions may be imposed based on component type (i.e., all components of a specific type are affected) or some other grouping.

After an access control or filter condition has been imposed on a component or a group of components stored in a database, the condition needs to be evaluated to ensure that it is correctly controlling access to the component or the group of components. Evaluation of access control or filter conditions is especially important with respect to traversals between components because it is easier to circumvent a condition through traversals.

For example, suppose a first condition has been imposed on all components of type A, a second condition has been imposed on all components of type B, and a third condition has been imposed on all components of type C. Additionally, suppose an entity only satisfies the first and third conditions. If the entity submits a query "A/B=>C", where "/" represents a hierarchical traversal and "=>" represents a lateral traversal, there should not be any components returned in the result set because the second condition has not been satisfied.

To properly evaluate the three conditions, all possible scenarios involving the three conditions must be verified. With three conditions, there are eight possible scenarios that need to be tested, e.g., where all three conditions are not satisfied, where only the first condition is satisfied, where only the second condition is satisfied, where only the third condition is satisfied, where only the first and second conditions are satisfied, where only the second and third conditions are satisfied, where only the first and third conditions are satisfied, and where all three conditions are satisfied.

When verification is based on a complete matching result set approach, it may be difficult for a test case developer to make sure that all scenarios are tested, especially when the number of conditions involved increases. In addition, it may take too much time to cover all of the scenarios. Moreover, with the complete matching result set approach, the test case developer has to evaluate each component returned in a result set to determine whether the component should have been returned or not. As the size of the result set increases, so does the potential for human error.

FIG. 1 illustrates a process 100 for evaluating access control or filter conditions according to an implementation of the invention. At 102, a test model involving a plurality of access control or filter conditions is developed. The test model may be a database statement, e.g., a Structured Query Language (SQL) statement, or a series of operations. Each of the plurality of access control or filter conditions is being imposed upon one or more components stored in a database. A component can be all or part of an image, an audio, a video, a text document, or a compound document (e.g., a document containing a combination of text, image, audio, and/or video).

At 104, a binary value is assigned to each of a plurality of scenarios of the test model. The binary value includes a binary digit for each of the plurality of access control or filter conditions. The binary digit represents passage or failure of the corresponding condition in the scenario. At 106, an expected result for each of the plurality of scenarios is calculated through a logical AND operation of the binary digits in the binary value assigned to the scenario.

By associating scenarios of a test model with binary values, binary counting can be used to ensure that all possible scenarios of the test model are covered. For instance, given a test model involving three conditions, it is relatively straight forward to determine that there are eight possible scenarios because a 3-digit binary number has eight possible values. In addition, the passage or failure of conditions in each scenario corresponds to the binary value of the scenario. As an example, in the sixth scenario, which is assigned binary value '110', the first condition, which corresponds to the left most binary digit, is satisfied, the second condition, which corresponds to the middle binary digit, is also satisfied, while the third condition, which corresponds to the right most digit, is not satisfied.

Figure 2:
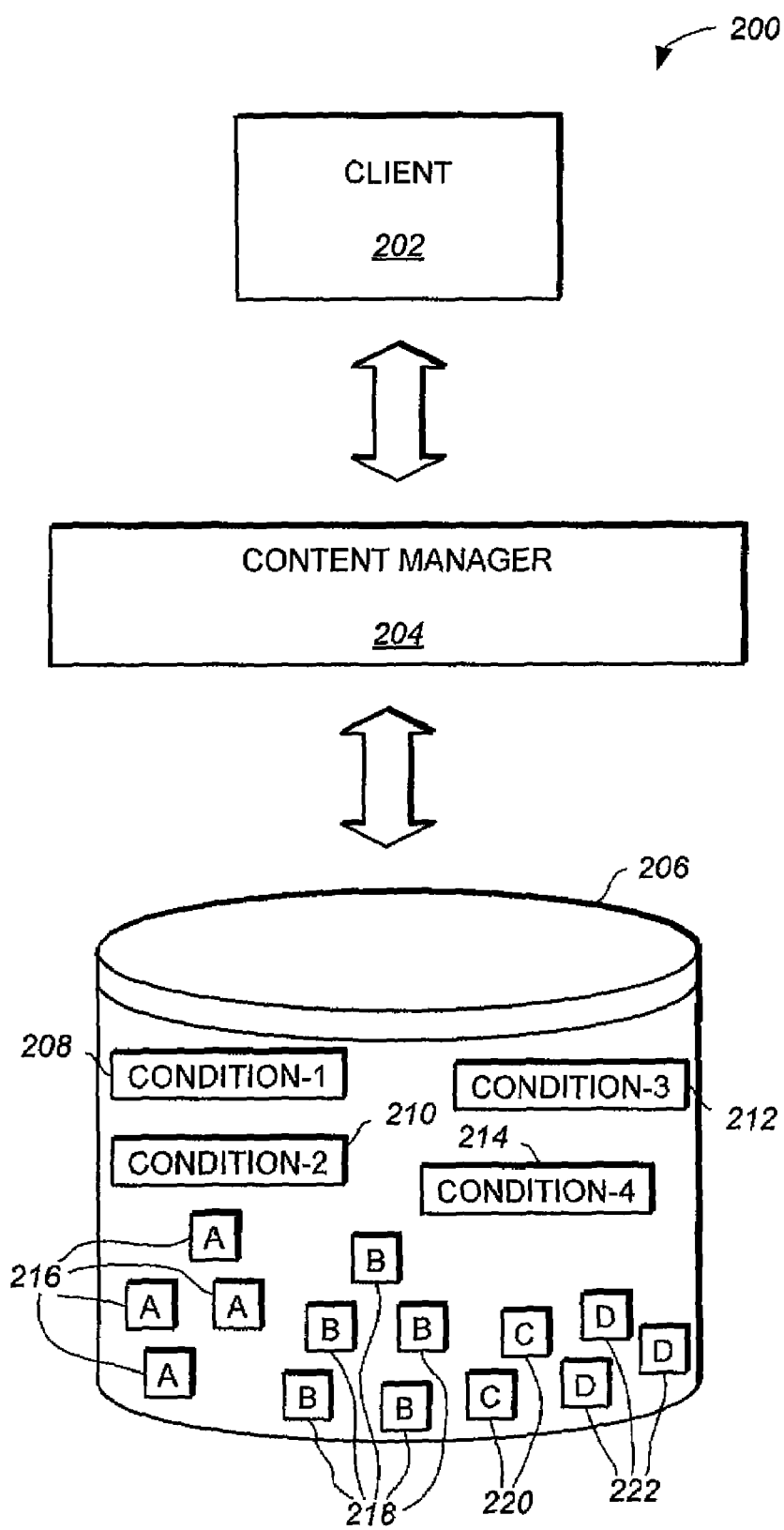
FIG. 2 is a system for evaluating access control or filter conditions according to an implementation of the invention.

Depicted in FIG. 2 is a system 200 for evaluating access control or filter conditions according to an implementation of the invention. System 200 includes a client 202 in communication with a content manager 204 operable to manage content stored in a database 206. Content manager 204 may be managing content in other databases (not shown). Client 202 and content manager 204 may be applications that are implemented on a desktop, a laptop, a workstation, etc., which may be on the same machine or on different machines. Alternatively, client 202 and content manager 204 may each represent a computer system, In addition, although not shown, client 202 and content manager 204 may be communicating with one another over a network, such as a WAN (Wide Area Network), a LAN (Local Area Network), or something else.

Stored in database 206 of FIG. 2 are conditions 208-214 and components 216-222. In the implementation, "Condition-1" 208 is being imposed upon "A" components 216, "Condition-2" 210 is being imposed upon "B" components 218, "Condition-3" 212 is being imposed upon "C" components 220, and "Condition-4" 214 is being imposed upon "D" components 222. Components with the same letter may denote components of the same type, category, etc., components that are part of a single document, image, video, audio, etc., or simply multiple copies of the same component.

It is not necessary that components and conditions imposed upon the components be stored in the same database, Nor does it necessarily follow that components sharing a common condition are stored in the same database. Further, a condition may apply to more than one type, category, or group of components and more than one condition may be imposed upon a component.

FIG. 3 shows an example test model 302 developed to evaluate conditions 208-214. In the example, test model 302 is a database statement "A =>B/C =>D". Since there are four different conditions involved in test model 302, a binary value assigned to each scenario of test model 302 will have four binary digits. With four-digit binary numbers, there are sixteen possible binary values, i.e., zero to fifteen. Thus, there are sixteen different scenarios in test model 302. Shown in table 304 of FIG. 3 are the sixteen possible scenarios of test model 302 and the binary value assigned to each scenario.

An expected result for each scenario of test model 302 can be calculated through a logical AND operation of the binary digits in the binary value assigned to the scenario. Table 306 in FIG. 3 shows the expected result for each of the sixteen possible scenarios of test model 302. For scenarios 1-15, the expected results are "0", i.e., false. Therefore, a result set from execution of test model 302 simulating any of the scenarios 1-15, should not include any "D" component 222. Whereas, a result set from execution of test model 302 simulating scenario 16, should include "D" components 222.

Figure 4:
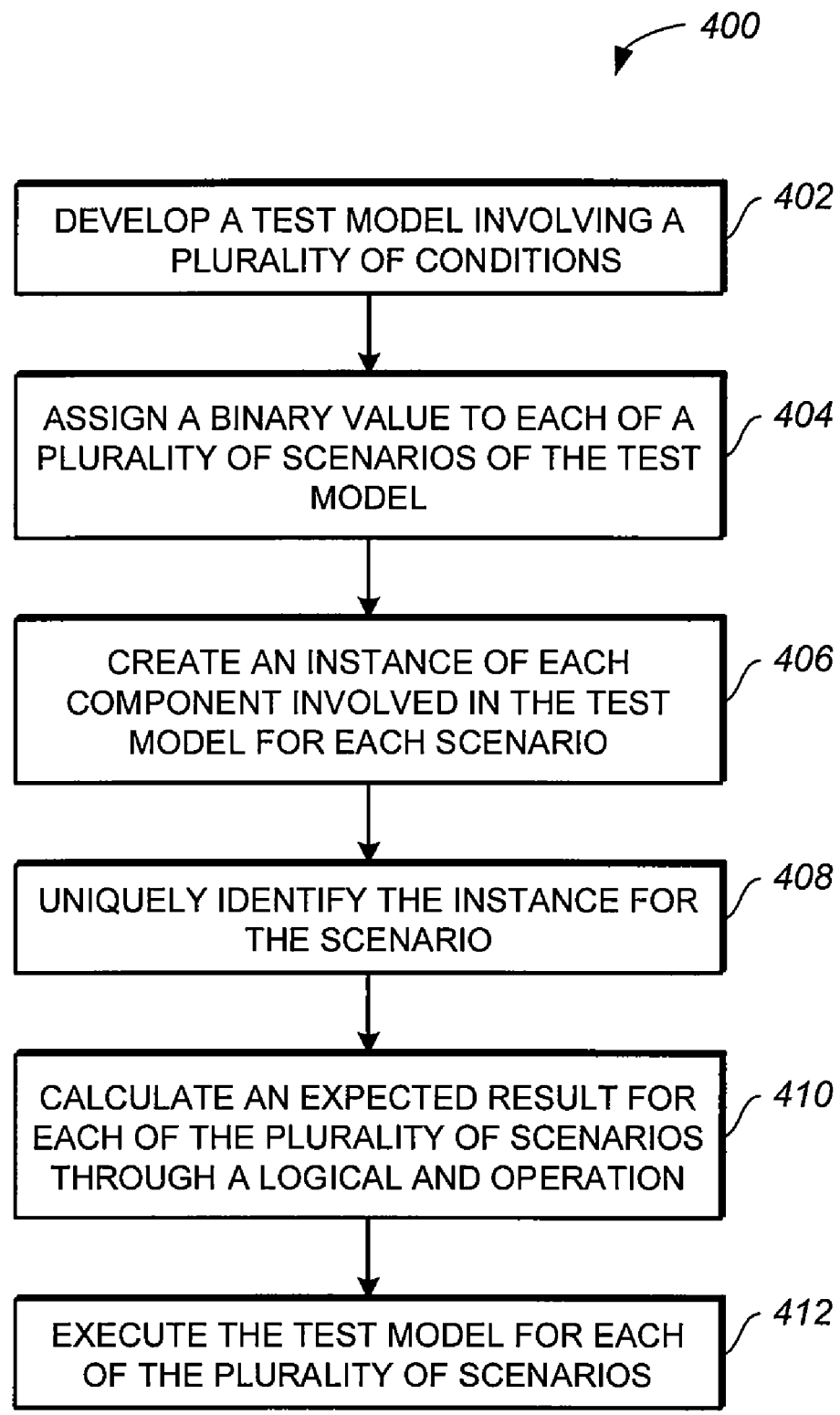
FIG. 4 illustrates a flowchart of a method for evaluating access control or filter conditions according to an implementation of the invention.

Illustrated in FIG. 4 is a process 400 for evaluating access control or filter conditions according to an implementation of the invention. At 402, a test model involving a plurality of access control or filter conditions is developed. Each of the plurality of access control or filter conditions is imposed upon one or more components stored in a database. A binary value is assigned to each of the plurality of scenarios at 404. The binary value includes a binary digit for each of the plurality of access control or filter conditions to represent passage or failure of the corresponding condition in the scenario.

At 406, an instance of each component involved in the test model is created for each scenario. The instance is then uniquely identified for the scenario at 408. For example, with respect to test model 302 in FIG. 3, an instance of "A" component 216 is created for each scenario, an instance of "B" component 218 is created for each scenario, an instance of "C" component 220 is created for each scenario, and an instance of "D" component 222 is created for each scenario. Thus, there will be sixteen "A" components, sixteen "B" components, sixteen "C" components, and sixteen "D" components, each one uniquely identified for the corresponding scenario.

The binary value for each scenario can be used as an identifier to uniquely identify an instance, such as, a component 'A-0000' for scenario 1, a component 'A-0001' for scenario 2, etc. Another identifier that can be used to uniquely identify an instance is the scenario number, e.g., a component 'A-1' for scenario 1, a component 'A-2' for scenario 2, etc. In another implementation, only an instance of each output component of the test model will be created for each scenario. For example, with respect to test model 302, only sixteen instances of "D" component 222 will be created because "D" component is the only output component.

At 410, an expected result for each of the plurality of scenarios is calculated through a logical AND operation of the binary digits in the binary value assigned to the scenario. In one implementation, the expected result of each of the plurality of scenarios is a presence or an absence of the instance of a component uniquely identified for the scenario. For example, the expected result for scenario 12 of test model 302 is the absence of component "D-1011", if the instances were uniquely identified using the binary value of each scenario.

The test model is then executed at 412 to simulate each of the plurality of scenarios to determine whether the expected result of the scenario is achieved. As an example, when test model 302 is executed to simulate scenario 1, the expected result is achieved if component "D-1" is not found in a result set of the execution, where instances of components are uniquely identified using the scenario number. In one implementation, a client, such as client 202 in FIG. 2, is operable to perform the actions of process 400.

By having a "component of focus" for each scenario, determining whether a condition is successful or not only involves identifying an output component that is expected to be found or not found for a scenario based on its unique identifier. Hence, conditions can be quickly evaluated to make sure the expected result for each scenario is achieved. In addition, the mechanism is much less prone to human error since only the "component of focus" needs to be identified.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
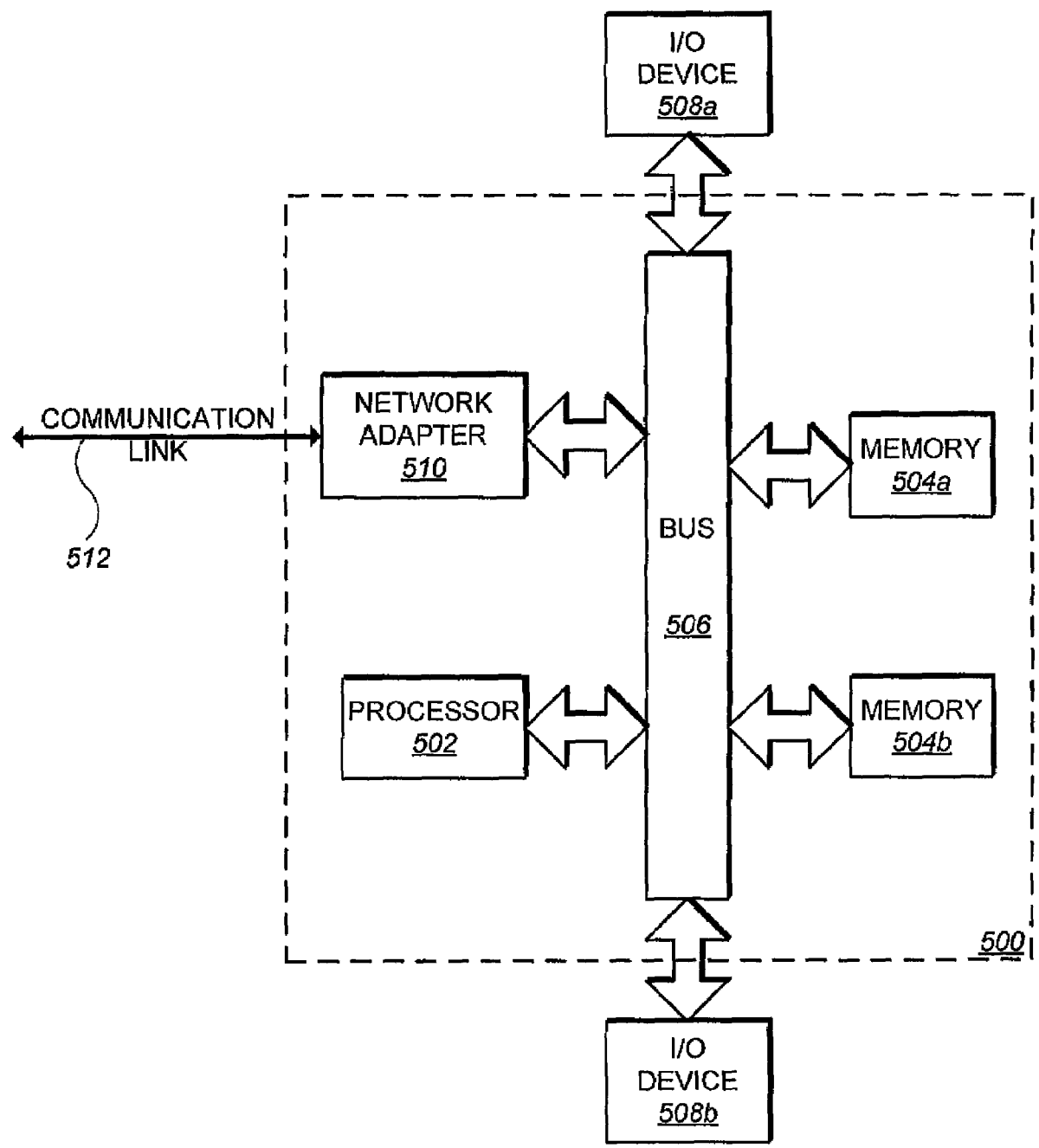
FIG. 5 is a block diagram of a data processing system with which implementations of the invention can be implemented.

FIG. 5 depicts a data processing system 500 suitable for storing and/or executing program code Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

By tying evaluation of filtering and access control conditions to binary logic, scenario development, data model setup, and verification are simplified. In addition, binary counting can be used to ensure all scenarios are covered. Further, results are easily validated by having a "component of focus". Thus, the chance for human error is reduced because less knowledge is required and an easier learning curve is provided.

While various implementations for evaluating access control or filter conditions have been described, the technical scope of the present invention is not limited thereto. It is to be understood by those skilled in the art that various modifications or improvements can be added to the above implementations. It is apparent from the appended claims that such modified or improved implementations fall within the technical scope of the present invention

What is claimed is:

1. A computer-implemented method for evaluating access control conditions or filter conditions, the method comprising:
developing a test model defined to evaluate whether a content manager correctly imposes a plurality of conditions upon one or more components stored in a database to prevent a traversal of a component relationship from circumventing one of the plurality of conditions, wherein the plurality of conditions is selected from at least one of the access control conditions and filter conditions, and wherein developing the test model comprises:
defining a plurality of scenarios of the test model, wherein each scenario is a simulation of a request to access the one or more components, wherein the request to access the one or more components specifies that at least one component is in at least one of a parent-child relationship and a sibling relationship with another component, wherein the simulation of the request of each scenario uniquely passes or fails each of the imposed plurality of conditions, wherein each scenario of the plurality of scenarios is defined to evaluate whether the imposed plurality of conditions correctly control access to the one or more components in response to the simulation of the request of the respective scenario, wherein a unique binary value is assigned to each scenario of the plurality of scenarios to represent the respective scenario, and wherein the unique binary value includes a binary digit for each of the plurality of conditions of the respective scenario, the binary digit representing passage or failure of the corresponding condition in the respective scenario;
storing the test model and the plurality of scenarios on one or more computer readable storage media; and
calculating, by operation of a computer processor, an expected result for each scenario of the plurality of scenarios through a logical AND operation of the binary digits in the binary value assigned to the respective scenario, wherein the expected result is achieved when the content manager correctly imposes the plurality of conditions of the respective scenario to control access to the one or more components.

2. The method of claim 1, wherein the plurality of scenarios includes a scenario for each possible binary value that has a number of binary digits equal to the number of conditions in the plurality of conditions.

3. The method of claim 1, further comprising:
uniquely identifying each component in the test model by:
creating an instance of each component involved in the test model for each scenario; and
uniquely identifying the instance for each scenario.

4. The method of claim 3, wherein the expected result of each of the plurality of scenarios is a presence or an absence of the instance of a component uniquely identified for the scenario.

5. The method of claim 1, further comprising:
executing the test model for each of the plurality of scenarios to determine whether the expected result of the scenario is achieved.

6. The method of claim 1, wherein the test model is a database statement or a series of operations.

7. The method of claim 1, wherein a component is all or part of a video, an audio, an image, a text document, or a compound document.

8. A computer program product comprising a computer readable storage medium, the computer readable storage medium including a computer readable program for evaluating access control conditions or filter conditions, wherein the computer readable program when executed on a computer causes the computer to:
develop a test model defined to evaluate whether a content manager correctly imposes a plurality of conditions upon one or more components stored in a database to prevent a traversal of a component relationship from circumventing one of the plurality of conditions, wherein the plurality of conditions is selected from at least one of the access control conditions and filter conditions, and wherein developing the test model comprises:
defining a plurality of scenarios of the test model, wherein each scenario is a simulation of a request to access the one or more components, wherein the request to access the one or more components specifies that at least one component is in at least one of a parent-child relationship and a sibling relationship with another component, wherein the simulation of the request of each scenario uniquely passes or fails each of the imposed plurality of conditions, wherein each scenario of the plurality of scenarios is defined to evaluate whether the imposed plurality of conditions correctly control access to the one or more components in response to the simulation of the request of the respective scenario, wherein a unique binary value is assigned to each scenario of the plurality of scenarios to represent the respective scenario, and wherein the unique binary value includes a binary digit for each of the plurality of conditions of the respective scenario, the binary digit representing passage or failure of the corresponding condition in the respective scenario;
store the test model and the plurality of scenarios on one or more computer readable storage media; and
calculate, by operation of a computer processor, an expected result for each scenario of the plurality of scenarios through a logical AND operation of the binary digits in the binary value assigned to the respective scenario, wherein the expected result is achieved when the content manager correctly imposes the plurality of conditions of the respective scenario to control access to the one or more components.

9. The computer program product of claim 8, wherein the plurality of scenarios includes a scenario for each possible binary value that has a number of binary digits equal to the number of conditions in the plurality of conditions.

10. The computer program product of claim 8, wherein the computer readable program when executed on the computer further causes the computer to:
uniquely identify each component in the test model by:
creating an instance of each component involved in the test model for each scenario; and
uniquely identifying the instance for each scenario.

11. The computer program product of claim 10, wherein the expected result of each of the plurality of scenarios is a presence or an absence of the instance of a component uniquely identified for the scenario.

12. The computer program product of claim 8, wherein the computer readable program when executed on the computer further causes the computer to:
execute the test model for each of the plurality of scenarios to determine whether the expected result of the scenario is achieved.

13. The computer program product of claim 8, wherein the test model is a database statement or a series of operations.

14. The computer program product of claim 8, wherein a component is all or part of a video, an audio, an image, a text document, or a compound document.

15. A system for evaluating access control conditions or filter conditions, the system comprising:
a database storing a plurality of components;
a content manager which configures one or more processors to control access to the plurality of components stored in the database; and
a client in communication with the content manager, wherein the client, when executed by one or more processors, is configured to:
develop a test model defined to evaluate whether the content manager correctly imposes a plurality of conditions upon one or more of the plurality of components stored in the database to prevent a traversal of a component relationship from circumventing one of the plurality of conditions, wherein the plurality of conditions is selected from at least one of the access control conditions and filter conditions, and wherein developing the test model comprises:
defining a plurality of scenarios of the test model, wherein each scenario is a simulation of a request to access the one or more components, wherein the request to access the one or more components specifies that at least one component is in at least one of a parent-child relationship and a sibling relationship with another component, wherein the simulation of the request of each scenario uniquely passes or fails each of the imposed plurality of conditions, wherein each scenario of the plurality of scenarios is defined to evaluate whether the imposed plurality of conditions correctly control access to the one or more components in response to the simulated request of the respective scenario, wherein a unique binary value is assigned to each scenario of the plurality of scenarios to represent the respective scenario, and wherein the unique binary value includes a binary digit for each of the plurality of conditions of the respective scenario, the binary digit representing passage or failure of the corresponding condition in the respective scenario;
store the test model and the plurality of scenarios on one or more computer readable storage media; and
calculate, by operation of a computer processor, an expected result for each scenario of the plurality of scenarios through a logical AND operation of the binary digits in the binary value assigned to the respective scenario, wherein the expected result is achieved when the content manager correctly imposes the plurality of conditions of the respective scenario to control access to the one or more components.

16. The system of claim 15, wherein the plurality of scenarios includes a scenario for each possible binary value that has a number of binary digits equal to the number of conditions in the plurality of conditions.

17. The system of claim 15, wherein the client is further configured to:
uniquely identify each component in the test model by:
creating an instance of each component involved in the test model for each scenario; and
uniquely identifying the instance for each scenario.

18. The system of claim 17, wherein the expected result of each of the plurality of scenarios is a presence or an absence of the instance of a component uniquely identified for the scenario.

19. The system of claim 15, wherein the client is further configured to:
execute the test model for each of the plurality of scenarios to determine whether the expected result of the scenario is achieved.

20. The system of claim 15, wherein the test model is a database statement or a series of operations.

* * * * *